United States Patent [19]

King, Jr. et al.

[11] Patent Number: 5,028,382
[45] Date of Patent: Jul. 2, 1991

[54] SCRATCH PREVENTING METHOD OF ASSEMBLING NUCLEAR FUEL BUNDLES, AND THE ASSEMBLY

[75] Inventors: Harold B. King, Jr., Wrightsville Beach; Tracy S. Harmon, Wilmington; Abdul G. Dada, Wilmington; Frederick C. Schoenig, Jr., Wilmington; Eileen F. Haag, Wilmington; Gerald W. McKenzie, Wilmington, all of N.C.

[73] Assignee: General Electric Company, San Jose, Calif.

[21] Appl. No.: 469,101

[22] Filed: Jan. 24, 1990

[51] Int. Cl.$^5$ .................... G21C 3/32; G21C 21/00
[52] U.S. Cl. ............................... 376/261; 376/902
[58] Field of Search ............ 376/902, 261, 260, 305, 376/438, 441, 446; 427/6, 154, 156

[56] References Cited

U.S. PATENT DOCUMENTS

| | | | |
|---|---|---|---|
| 3,531,311 | 9/1970 | Prior | 427/154 |
| 3,757,403 | 9/1973 | Bleiberg | 376/902 |
| 4,071,639 | 1/1978 | Palmer et al. | 376/305 |
| 4,740,351 | 8/1988 | Katsumizu et al. | 376/446 |
| 4,800,061 | 1/1989 | Shallenberger et al. | 376/261 |

FOREIGN PATENT DOCUMENTS 64-31095  2/1989  Japan.
1-113699  5/1989  Japan.

Primary Examiner—Daniel D. Wasil
Attorney, Agent, or Firm—R. R. Schroeder

[57] ABSTRACT

The disclosed invention comprises a method for assembling fuel bundles for service in nuclear reactors which minimizes damage to the assembled components of a nature that renders the components susceptible to destructive corrosion in service, and the enhanced product of the improved method. The invention includes the utilization of a temporary protective barrier, such as water soluble sodium silicate or gelatin, intermediate the components during assembly.

20 Claims, 2 Drawing Sheets

SCRATCH PREVENTING METHOD OF ASSEMBLING NUCLEAR FUEL BUNDLES, AND THE ASSEMBLY

FIELD OF THE INVENTION

This invention deals with the manufacture of nuclear fuel bundles comprising assembling a group of individual fuel rod elements and structural components into a designed array of the fuel elements and thereby producing typical composite fuel bundles or assemblages for service in conventional water cooled and moderated, power generating nuclear reactor plants. The invention comprises an improvement in the manufacturing method and subsequent handling which reduces and minimizes damage to the assembled components, and in turn provides an enhanced nuclear fuel product.

BACKGROUND OF THE INVENTION

Fissionable fuel materials such as oxides of uranium, plutonium or thorium, and combinations thereof, are typically formed into small cylindrical pellets and housed within sealed tubes or elongated containers sometimes referred to in the art as "cladding". The sealed fuel containers protect the fuel from reacting with the coolant, or any foreign matter entrained therein, and prevent the escape of any fission products from the fuel, which are normally highly radioactive and corrosive, into the coolant and in turn contamination of the overall system. Thus the enduring integrity of the sealed container housing the fissionable fuel is therefore of the utmost importance.

Large capacity power generating nuclear fission reactor plants normally employ several hundreds of such sealed tubular containers housing fissionable fuel. To facilitate the periodic refueling, which commonly is performed by replacing fractional portions of the total fuel at intervals and rearranging other fractional portions, the tubular fuel containers, or fuel elements consisting of same, are conventional assembled into bundles or groups of approximately 40 to 90 elements which can be handled and manipulated as a single composite unit.

Elongated or tubular containers housing fissionable nuclear fuel materials are therefore assembled into a designed array conventionally comprising a group of spaced apart, parallel aligned tubular containers of fuel secured by mechanical means. A typical fuel bundle comprises, for example, an eight by eight or nine by nine array of spaced fuel containers. The tubular fuel containers usually are several feet in length, such as about 14 feet, and approximately one-half inch in diameter and are each spaced from the others a fraction of an inch. The spacing is required to permit an ample flow of heat removing coolant, such as water, over the full exterior surface of all tubular fuel containers for effective heat transfer and thus effective operation.

To inhibit such elongated fuel elements from bowing and vibrating due to high heat and velocities of coolant flowing thereabout, whereby they can contact each other and in any case impede or unbalance coolant flow, it is necessary to retain the tubular fuel elements in their spaced apart array or relation by means of a plurality of spacing units positioned at intervals along their length.

Typical spacing units for tubular fuel elements comprise a frame having a multiplicity of crossing components or lattice which form or provide a plurality of opening arranged in the designated pattern for spacing the parallel aligned fuel elements. A group of the tubular fuel elements are each inserted into and passed through the aligned opening of a series such spacing units positioned at the intervals along the length of the elements in a predetermined pattern or distance. Thus with each elongated fuel element of a group traversing several spacing units at intervals which provide intermediate restraint and support transverse of the group, the spaced apart, parallel aligned fuel elements are each restrained from lateral bowing and vibration which could damage their structure or impede effective coolant flow intermediate and around each fuel container. A common commercial embodiment of a nuclear reactor fuel bundle has about seven such spacer units securing all tubular fuel elements extending therethrough which are positioned at intervals along the length of the grouped array of elements.

Spacing units for securing bundles of fuel rod elements frequently contain spring and stop members which press against the fuel rod elements in metal to metal contact as a means of securely gripping and holding the fuel rod elements in position.

The assembled bundle of a group of spaced apart, parallel aligned array of the tubular fuel elements secured to each other by traversing through the openings of a series of spacing units positioned at intervals along their length additionally have each of their ends supported in sockets of tie plates. This bundle assembly is also typically surrounded by an open ended tubular channel of suitable cross-section such as square, to direct the flow of coolant longitudinally along the surface of the fuel elements and guide the neutron absorbing fission control rod units which move reciprocally longitudinally intermediate the channel surrounded bundle of fuel elements.

Typical fuel bundle assembles of the foregoing common construction are disclosed in Letters U.S. Pat. No. 3,350,275, issued October 1967 and U.S. Pat. No. 3,654,077, issued Apr. 4, 1972. The disclosed contents of said patents, and those cited therein, are incorporated herein by reference.

Structural components utilized within the reactor core of fissionable fuel, such as the tubular containers housing the fuel and their spacing units, etc. must be fabricated from a durable metal which has a low neutron absorbing capacity, or cross section, so as not to impede the neutron incited fission chain reaction. The preferred material most commonly used comprises alloys of zirconium which have a neutron absorption capacity in the order of about one-fifteenth of that of stainless steel. However zirconium alloys are under certain circumstances susceptible to corrosion which can result in its structural failure. To impede a destructive form of self-perpetuating corrosion peculiar to zirconium and its alloys referred to in the art as modular corrosion, components produced from zirconium alloys, such as fuel containers, are commonly treated to form a specific oxide surface layer which resists modular corrosion and surface attack under reactor conditions.

SUMMARY OF THE INVENTION

This invention comprises an improved method of assembling bundles of nuclear fuel elements transversely passing through a series of spacing units positioned at intervals which reduces the potential for a subsequent occurrence of destructive corrosion, and the enhanced assembled product. The improved method utilizes unique measures for preventing any damage or abrasion to the metal surfaces of the metal components of a nuclear fuel bundle while undergoing assembly and thereafter during shipping and handling, until installed within a nuclear reactor fuel core for operation.

OBJECTS OF THE INVENTION

It is a primary object of this invention to provide an improved method of producing nuclear fuel bundles, and an enhanced product of the method.

It is also an object of this invention to provide a method of assembling nuclear fuel bundles which reduces the potential for surface damage to metal components.

It is another object of this invention to provide a method of assembling nuclear fuel bundles which reduces the potential for subsequent corrosion damage to the bundle components.

It is still another object of this invention to provide an improved low cost and effective method of manufacturing nuclear fuel bundles which enhances the structural integrity and durability of the nuclear fuel bundles in reactor service.

It is a further object to provide a nuclear fuel bundle of assembled nuclear fuel elements secured together in a spaced apart, parallel grouping secured in such an array by each passing transversely through a series of spacing units at intervals which is essentially free of damage or abrasion attributable to assembly, and/or thereafter during shipping and handling.

DETAILED DESCRIPTION OF THE INVENTION

Figure 1:
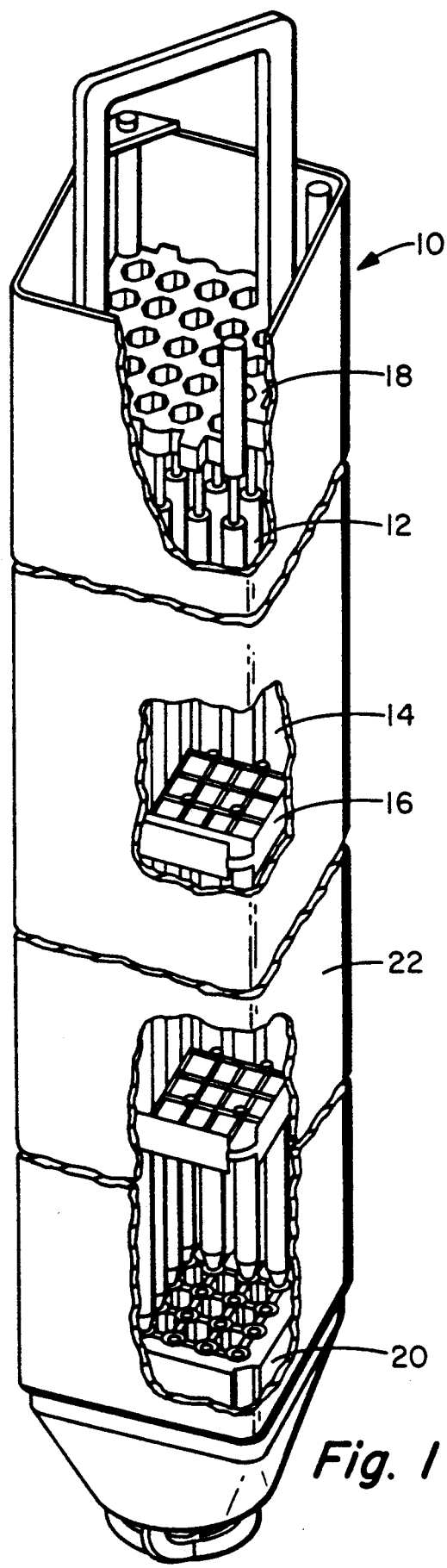
FIG. 1 of the drawing comprises a perspective view, partly in section, of an assembled nuclear fuel bundle comprising nuclear fuel elements secured in a group with spacing units.
Figure 2:
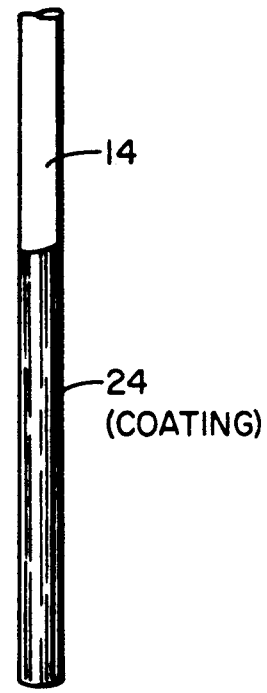
FIG. 2 of the drawing comprises a perspective partial view of one embodiment of this invention.

Referring to FIG. 1 of the drawing, a typical nuclear fuel bundle 10 comprises a group of spaced apart, parallel aligned fuel rod elements 12. Fuel rod elements 12 comprise a container 14 housing fissionable fuel (not shown) sealed therein. Fuel rod elements 12 are secured in the spaced apart, parallel aligned array by each passing transversely through a series of spacing units 16 positioned at intervals along the length of the grouped array of fuel rod elements 12. Both ends of the grouped array of fuel rod elements are fixed within sockets of upper and lower tie plates 18 and 20. The bundle assembly of grouped fuel rod elements 12 and securing spacing units 16 is surrounded by an open ended channel 22.

It has been determined that abrasions or damage such as scratches in the surface of metal fuel rod elements present potential sites for the subsequent occurrence of destructive forms of corrosion. For example, surface abrasions or scratches in zirconium alloys render the site susceptible to a form of corrosion which can result in progressive erosion when exposed to the aggressive thermal and chemical environment of a nuclear reactor fuel core. This progressive form of corrosion, referred to as modular corrosion because it occurs as a deeply penetrating area of erosion producing a white oxide surface module, can significantly impair the structural integrity of the metal wall of fuel rod elements to the degree of rendering the elements vulnerable to breaching. Such a corrosion penetration or impairment leading to rupture of a fuel rod element results in leakage of radioactive fission products from the fuel container into the coolant which carries the contaminants throughout the system, and/or the entry of coolant and any entrained impurities into the container and contact with the fissionable fuel.

Evaluations have demonstrated that surface abrasions and damage such as scratches are primarily due to assembly of the fuel bundles, in particular the meeting of the fuel rod elements passing through openings in the spacing units in fabricating the grouped array of fuel containers traversing through a series of spacing units at spaced intervals.

However, such damage or abrasions can also occur prior to assembly as a result of preassembly handling the fuel rod containers, such as rubbing against each other or contact with storage and production structural members, or after assembly such as during shipping and/or handling prior to installation in the reactor fuel core.

In accordance with this invention a scratch resisting, temporary protective barrier of a water soluble material is applied intermediate to the fuel rod elements and the openings of the spacing units prior to assembly, then subsequently removed from the assembled components or bundle.

A preferred measure of this invention comprises applying a scratch resisting, temporary coating 24 of a water soluble sodium silicate or gelatin over the outer surface of each fuel rod container 14 prior to assembly, and optimally as early in production stages as practical. Following assembly of the fuel bundle comprising inserting the protective coated fuel rod containers 14 through the spacer unites 16, or later, the water soluble protective coating can be readily removed, when feasible, by the application of hot water or steam, and preferably a combination of hot water and steam. For example, good results can be obtained by soaking in water briefly, about five minutes, then applying steam.

Sodium silicate and gelatin, or protein material derived from animal material, being water soluble, can be readily applied as a water soluble solution to form a coating film of any apt thickness, and subsequently effectively removed completely with a hot water bath and/or steam spray. These protective coatings are easy to apply and remove, the materials do not effect or react with the metal surface, and they are environmentally innocuous and wastes can be disposed of with minimal concern.

Figure 3:
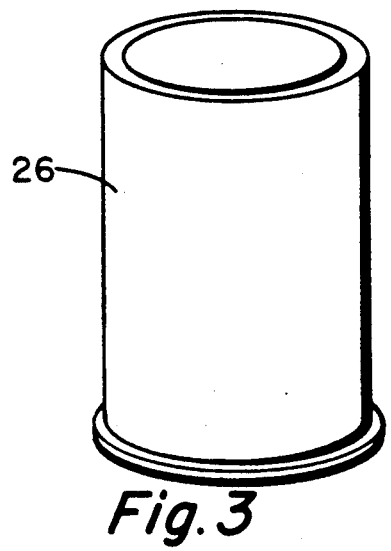
FIG. 3 of the drawing comprises a perspective view of another embodiment of this invention.

Another preferred embodiment of this invention, shown in FIG. 3, comprises the utilization of protective "sleeves" 26, or tube sections composed of water soluble gelatin which are installed within the openings of the spacing units 16 that receive the fuel rod containers 14 by insertion therethrough. Gelatin sleeves positioned intermediate the openings in the spacing units 16 and the fuel rod containers 14 inserted therethrough prevents abrasion or damage such as scratching of the fuel containers 14, and are readily removable with hot water or steam when appropriate.

Figure 4:
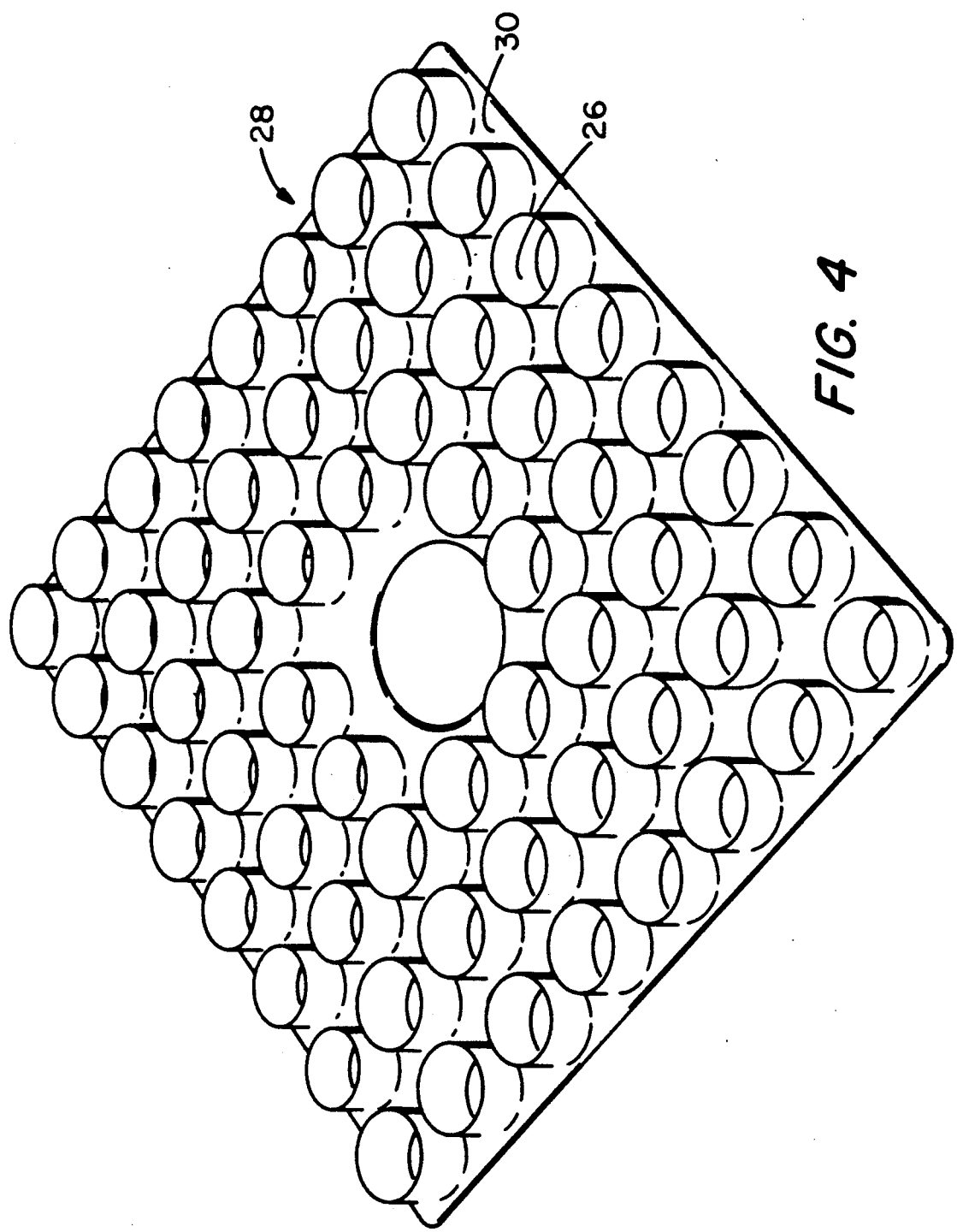
FIG. 4 of the drawing comprises a perspective view of a composite component of this invention.

Gelatin sleeves 26 can be molded as a multiple unit of joined sleeves with a number and in a pattern matching the openings of a given spacing unit 16 design, such as the composite unit 28 shown in FIG. 4, whereby all sleeves for a single spacing unit 16 can be installed together as a unit to facilitate the assembly operation. A preferred composite unit 28 comprises a flat base connecting member 30 joining a multiplicity of sleeves 26 projecting therefrom. Moreover, this technique insures that some protective sleeve installation in a spacing unit are not overlooked prior to assembly whereby some damage to the inserted fuel rod containers might occur.

The thickness of the water soluble sodium silicate or gelatin coating 24 or sleeve 26, including a composite of multiple sleeves 28, can be easily regulated by controlling the viscosity of the water solution, and temperatures used in its application. Also the thickness of the coating 24 or gelatin sleeve 26 or composite 28 needed for adequate protection can be reduced by the inclusion therein of a lubricant in the form of a liquid or dry powder, preferably of a water soluble composition or form to facilitate removal. A lubricant reduces the level of friction at contact points, which in turn reduces the thickness for adequate protection.

Due to the stringent requirements of nuclear reactor service, namely that the coolant system be as free as possible for any foreign materials or ingredients, it is especially important that all extrinsic matter be removed from the assembled fuel bundles before they are put into service. The water soluble agents employed in this invention are readily removable in a hot water bath or any washing with hot water or steam, including spraying. This ease of removal without the need for special equipment, provides for leaving the protective measures of the invention in place in the fuel bundle to protect it from damage up to the time of its installation within the reactor fuel core since the materials can be easily removed at the reactor site just before installation for service.

Moreover, to insure the complete removal of all extrinsic protective material from the assembled fuel bundle before use, a small amount of an indicator material, such as a fluorescent agent can be included in the water soluble sodium silicate or gelatin. For example, vitamin B-2 (riboflavin) or fluorescein disodium salt. Such agents will absorb specific wavelengths of ultraviolet radiation and reemit the energy as visible light. This phenomenon of such agents can be used for post removal inspection to determine complete elimination. Also this means is suitable for use with on-line rinse water concentration measurement with a spectrophotometer to evaluate removal and cleanliness.

An additional aspect of this invention comprises protecting assembled fuel bundles throughout subsequent handling and/or shipping, until the time of their installation into a nuclear reactor fuel core for performance in the fission reaction. Thus, other than protecting the fuel rod elements by means of temporary coating or sleeves, this invention comprises providing a temporary barrier of a water soluble material consisting of sodium silicate and/or gelatin, within fuel bundles intermediate the components thereof including fuel rod elements 12 and openings of the spacing units 16 and including substantially occupying all the remaining free area within the surrounding channel 22.

The water soluble materials providing the temporary barrier substantially filling the free or open area within the channel unit 22 defining the perimeter of the fuel bundle, and as such essentially surrounding the fuel rod elements and spacing units, can be left in place throughout handling, storage and/or shipping of the fuel bundles to protect all components against damage up until the fuel bundles are on site at the reactor plant and ready for installation into the fuel core. At this time, the water soluble, temporary barrier material is removed with hot water and/or steam as noted above just prior to installation, whereby potential damage occuring any time from prior to their assembly through to the time of installation in a reactor fuel core can be minimized.

An example of a preferred means for the practice of this invention is as follows:

A temporary protective barrier comprising a composite unit of joined multiple gelatin sleeves which correspond to the fuel rod receiving openings in a spacing unit and are of a dimension to extend therethrough and cover spacer springs over all contact points, is produced accordingly.

The composite gelatin sleeve protective barrier is molded from a gelatin solution on a metal mold comprising aptly sized, slightly tapered studs secured to a flat base connecting member. Preferably the studs would be provided with mold relief taper radiuses, and fillets to eliminate sharp edges and corners. Also, the mold should be provided with a suitable release agent such a coating of vegetable oil.

The suitably designed and prepared mold is immersed into a liquid solution of gelatin, preferably containing additives to enhance its strength, shrinkage, and cleanliness testing. One such additive comprises glycerin which increased the flexibility of gelatin, and fluorescein disodium salt comprises a cleanliness testing additive. The viscosity and temperature of a water soluble molding solution is controlled to provide the desired thickness of the formed sleeves. The molding technique can be modeled on the manufacture of gelatin capsules in the pharmaceutical industry.

Drying of the molded composite sleeve unit is effected by passing through zones of temperature and humidity control. The rate and degree of drying the water soluble gelatin can influence the strength and consistency of the unit.

The dried gelatin sleeve unit is easily removed from the mold by providing the mold with a floating base plate which can be moved along the studs so as to strip the molded gelatin sleeves from the studs. The end of each molded sleeve can be cut with an X slot or a puncture to enable easy passage of fuel rod through the sleeve end during assembly of the fuel bundle. The X cut or puncture should occur prior to removal from the mold to prevent vacuum collapse of the sleeves during removal from the mold.

The molded and dried multiple sleeve unit of gelatin is inserted into a metal spacing unit prior to its mounting in the fuel bundle assembling fixtures or frames. The connecting base of the multiple sleeves should be positioned on the side of the spacing unit where the fuel rod elements first enter in passing transversely therethrough. This connecting base will rest on the spacer unit and act to prevent the attached protective sleeves from being forced through the spacing unit as the fuel rods are inserted and moved therethrough.

After the fuel bundle is assembled the assembled bundle is placed in a suitable vessel and briefly soaked in cold water, then hot water is flowed over its surfaces to dissolve the water soluble gelatin material and flush the dissolved gelatin from the fuel bundle. The final flushing is monitored for traces of fluorescein to determine whether the assembled fuel bundle is fully cleaned and free of all gelatin. When cleaning is complete the fuel bundles is dried with hot air.

What is claimed is:

1. A method of inhibiting damage due to component contact in a bundle of nuclear fuel elements for service in a nuclear reactor, including a group of fuel rod elements each arranged in a spaced apart, parallel array and thus secured by each element traversing through a series of spacing units positioned at intervals along the length of the grouped fuel rod elements and having openings for receiving the fuel rod elements traversing therethrough consisting essentially of the step of providing a scratch resisting, temporary protective barrier consisting of water soluble sodium silicide applied intermediate the components comprising the fuel rod elements and openings of the spacing units.

2. A method of inhibiting damage due to component contact in a bundle of nuclear fuel elements for service in a nuclear reactor, including a group of fuel rod elements each arranged in a spaced apart, parallel array and thus secured by each element traversing through a series of spacing units positioned at intervals along the length of the grouped fuel rod elements and having openings for receiving the fuel rod elements traversing therethrough consisting essentially of the step of providing a scratch resisting, temporary protective barrier consisting of water soluble gelatin applied intermediate the components comprising the fuel rod elements and openings of the spacing units.

3. A method of assembling a bundle of nuclear fuel elements for service in a nuclear reactor, including a group of fuel rod elements each arranged in a spaced apart, parallel array and thus secured by each element traversing through a series of spacings units positioned at intervals along the length of the grouped fuel rod elements and having openings for receiving the fuel rod elements traversing therethrough, consisting essentially of the steps of: providing a scratch resisting, temporary protective barrier consisting of water soluble sodium silicate applied as a coating to the fuel rod elements and then assembling the fuel bundle by passing each of the coated fuel rod elements through the openings of a series of spacing units positioned at intervals to fit together an adjoined composite fuel bundle assembly of a spaced apart parallel array of the fuel rod elements secured with spacing units.

4. A method of assembling a bundle of nuclear fuel elements for service in a nuclear reactor, including a group of fuel rod elements each arranged in a spaced apart, parallel array and thus secured by each element traversing through a series of spacings units positioned at intervals along the length of the grouped fuel rod elements and having openings for receiving the fuel rod elements traversing therethrough, consisting essentially of the steps of: providing a scratch resisting, temporary protective barrier consisting of water soluble gelatin applied as a sleeve within the openings of the series of spacing units and then assembling the fuel bundle by passing each of the fuel rod elements through the sleeves within the openings of a series of spacing units positioned at intervals to fit together an adjoined composite fuel bundle assembly of a spaced apart parallel array of the fuel rod elements secured with spacing units.

5. A method of assembling a bundle of nuclear fuel elements for service in a nuclear reactor, including a group of fuel rod elements each arranged in a spaced apart, parallel array and thus secured by each element traversing through a series of spacings units positioned at intervals along the length of the grouped fuel rod elements and having openings for receiving the fuel rod elements traversing therethrough, consisting essentially of the steps of: providing a scratch resisting, temporary protective barrier consisting of water soluble sodium silicate applied as a coating to the fuel rod elements and then assembling the fuel bundle by passing each of the coated fuel rod elements through the openings of a series of spacing units and removing the scratch resisting, temporary protective barrier of water soluble material from the assembled fuel bundle with hot water.

6. The method of assembling a bundle of nuclear fuel of claim 5, comprising removing the scratch resisting, temporary protective barrier consisting of a water soluble material from the assembled fuel bundle with steam.

7. A method of assembling a bundle of nuclear fuel elements for service in a nuclear reactor, including a group of fuel rod elements each arranged in a spaced apart, parallel array and thus secured by each element traversing through a series of spacing units positioned at intervals along the length of the grouped fuel rod elements and having openings for receiving the fuel rod elements traversing therethrough, consisting essentially of the steps of: providing a scratch resisting, temporary protective barrier of water soluble gelatin applied as a sleeve of gelatin within the openings of the series of spacing units and then assembling the fuel bundle by passing each of the fuel rod elements through a gelatin sleeve within the openings of a series of spacing units.

8. A method of assembling a bundle of nuclear fuel elements for service in a nuclear reactor, including a group of fuel rod elements each arranged in a space apart, parallel array and thus secured by each element traversing through a series of spacing units positioned at intervals along the length of the grouped fuel rod elements and having openings for receiving the fuel rod elements traversing therethrough, consisting essentially of the steps of: providing a scratch resisting, temporary protective barrier consisting of a water soluble coating of sodium silicate covering the outer surface of the fuel rod elements, then assembling the fuel bundle by passing each of the fuel rod elements through the openings of a series of spacing units positioned at intervals to fit together an adjoined composite fuel bundle assembly of a spaced apart parallel array of the fuel rod elements secured with spacing units, and removing the scratch resisting, temporary protective barrier consisting of water soluble coating of sodium silicate from the assembled fuel bundle with hot water.

9. The method of assembling a bundle of nuclear fuel of claim 8, wherein a fluorescent agent is included in the water soluble coating consisting of sodium silicate.

10. A method of assembling a bundle of nuclear fuel elements for service in a nuclear reactor, including a group of fuel rod elements each arranged in a spaced apart, parallel array and thus secured by each element traversing through a series of spacing units positioned at intervals along the length of the grouped fuel rod elements and having openings for receiving the fuel rod elements traversing therethrough, consisting essentially of the steps of: providing a scratch resisting, temporary protective barrier of water soluble gelatin applied as a sleeve of gelatin within the openings of the series of spacing units, then assembling the fuel bundle by passing each of the fuel rod elements through a gelatin sleeve within the openings of a series of spacing units, then assembling the fuel bundle by passing each of the fuel rod elements through a gelatin sleeve within the openings of a series of spacing units positioned at intervals to fit together an adjoined composite fuel bundle assembly of a spaced apart parallel array of the fuel rod elements secured with the spacing units, and removing the scratch resisting, temporary protective barrier of water soluble gelatin sleeves from within the openings of the series of spacing units with hot water.

11. The method of assembling a bundle of nuclear fuel of claim 9, wherein a fluorescent agent is included in the water soluble gelatin sleeve.

12. A method of assembling a bundle of nuclear fuel elements for service in a nuclear reactor, including a group of fuel rod elements each arranged in a spaced apart, parallel array and thus secured by each element traversing through a series of spacing units positioned at intervals along the length of the grouped fuel rod elements and having openings for receiving the fuel rod elements traversing therethrough, consisting essentially of the steps of: providing a scratch resisting, temporary protective barrier of a water soluble coating of a gelatin covering the surface of the fuel rod elements, then assembling the fuel bundle by passing each of the fuel rod elements through the openings of a series of spacing units positioned at intervals to fit together an adjoined composite fuel bundle assembly of a spaced apart parallel array of the fuel rod elements secured with spacing units, and removing the scratch resisting, temporary protective barrier of water soluble coating of gelating from the assembled fuel bundle with hot water.

13. The method of assembling a bundle of nuclear fuel of claim 12, comprising removing the scratch resisting, temporary protective coating of gelatin from the assembled fuel bundle with steam.

14. The method of assembling bundle of nuclear fuel of claim 12, wherein a fluorescent agent is included in the water soluble coating of gelatin.

15. A bundle of nuclear fuel elements for service in a nuclear reactor comprising a group of fuel rod elements each arranged in a spaced apart, parallel array and thus secured by each element traversing through a series of spacings units positioned at intervals along the length of the grouped fuel rod elements and having openings for receiving the fuel rod elements traversing therethrough, a scratch resisting temporary protective barrier consisting essentially of a coating of water soluble sodium silicate on the fuel rod elements.

16. A bundle of nuclear fuel elements for service in a nuclear reactor comprising a group of fuel rod elements each arranged in a spaced apart, parallel array and thus secured by each element traversing through a series of spacings units positioned at intervals along the length of the grouped fuel rod elements and having openings for receiving the fuel rod elements traversing therethrough, a scratch resisting temporary protective barrier consisting essentially of a sleeve of water soluble gelatin within the openings of the series of spacing units.

17. A method of inhibiting damage due to component contact in a bundle of nuclear fuel elements for service in a nuclear reactor, including a group of fuel rod elements each arranged in a spaced apart, parallel array and thus secured by each element traversing through a series of spacing units positioned at intervals along the length of the grouped fuel rod elements and having openings for receiving the fuel rod elements traversing therethrough and surrounded by an open ended channel, consisting essentially of the steps of providing a temporary protective barrier consisting of water soluble sodium silicate applied intermediate the components and substantially occupying the area within the surrounding channel.

18. A method of inhibiting damage due to component contact in a bundle of nuclear fuel elements for service in a nuclear reactor, including a group of fuel rod elements each arranged in a spaced apart, parallel array and thus secured by each element traversing through a series of spacing units positioned at intervals along the length of the grouped fuel rod elements and having openings for receiving the fuel rod elements traversing therethrough and surrounded by an open ended channel, consisting essentially of the steps of providing a temporary protective barrier of water soluble gelating applied intermediate the components and substantially occupying the area within the surrounding channel.

19. A bundle of nuclear fuel elements for service in a nuclear reactor comprising a group of fuel rod elements each arranged in a spaced apart, parallel array and thus secured by each element traversing through a series of spacings units positioned at intervals along the length of the grouped fuel rod elements and having opening for receiving the fuel rod elements traversing therethrough and surrounded by an open ended channel, a scratch resisting, temporary protective barrier consisting of sodium silicate intermediate the fuel rod elements and the openings of the spacing units and substantially occupying the area between the fuel rod elements with the surrounding channel.

20. A bundle of nuclear fuel elements for service in a nuclear reactor comprising a group of fuel rod elements each arranged in a spaced apart, parallel array and thus secured by each element traversing through a series of spacings units positioned at intervals along the length of the grouped fuel rod elements and having opening for receiving the fuel rod elements traversing therethrough and surrounded by an open ended channel, a scratch resisting, temporary protective barrier of a water soluble material consisting of gelatin intermediate the fuel rod elements and the openings of the spacing units and substantially occupying the area between the fuel rod elements with the surrounding channel.

* * * * *